United States Patent
Phan

(10) Patent No.: US 7,240,360 B1
(45) Date of Patent: Jul. 3, 2007

(54) SYSTEM AND METHOD FOR CONTROLLING ACCESS TO USER INTERFACE ELEMENTS

(75) Inventor: Cung Ngoc Phan, Anaheim, CA (US)

(73) Assignee: Microsoft Corporation, Redmond, WA (US)

( * ) Notice: Subject to any disclaimer, the term of this patent is extended or adjusted under 35 U.S.C. 154(b) by 639 days.

(21) Appl. No.: 09/756,591

(22) Filed: Jan. 8, 2001

(51) Int. Cl.
*H04L 9/32* (2006.01)

(52) U.S. Cl. .............................. 726/2; 726/27; 726/28

(58) Field of Classification Search ........ 713/164–167, 713/200–202; 705/50–52; 707/1, 9, 100; 726/27–30, 2–7
See application file for complete search history.

(56) References Cited

U.S. PATENT DOCUMENTS

| | | | |
|---|---|---|---|
| 4,570,223 A | | 2/1986 | Yoshimoto |
| 4,651,279 A | | 3/1987 | Suzuki |
| 5,720,033 A | * | 2/1998 | Deo ........................... 713/200 |
| 5,729,734 A | * | 3/1998 | Parker et al. .................. 707/9 |
| 5,778,368 A | * | 7/1998 | Hogan et al. ................. 707/10 |
| 6,119,933 A | * | 9/2000 | Wong et al. ................. 235/380 |

OTHER PUBLICATIONS

MICROSOFT, Microsoft Windows User Experience, Published by Microsoft Press Date Published: Sep. 1999; ISBN: 0735605661.

PEACHTREE, User's Guide for Peachtree Office Accounting 6.0, Published by Peachtree Software Inc., 1998, pp. 501-507.

* cited by examiner

*Primary Examiner*—Hosuk Song
(74) *Attorney, Agent, or Firm*—Leanne R. Taveggia; Westman, Champlin & Kelly, P.A.

(57) ABSTRACT

A method and system is disclosed for interactively controlling user access to a plurality of user interface elements contained in a graphical user interface of a computer program. An access control profile means is associated with each user of the computer program. An access control profile means is associated with each user interface element in the computer program. An authorized administrator can select an access control profile means for each user interface element. Each access control profile means includes an option to assign user access privileges to view the data contained in the user interface element, activate a function contained in the user interface element, and an option to assign user access privileges to edit the data contained in the user interface element. The authorized administrator can interactively assign these access privileges to each and every user interface element contained in the program, therefore controlling the manner and method in which each user interface element is displayed to a variety of users depending upon the user's particular level of access privilege and use of the computer program, thus giving greater control of the computer program's features and data to the administrator while increasing ease of use to the users and administrators of the computer program.

17 Claims, 8 Drawing Sheets

Figure 1

Inventory Item Properties

Item Lookup Code — 2002 — 110

Item Description — Bike, Mongoose — 120

Price — $ 1,299.00 — 130

Cost — $ 920.00 — 140

Profit Margin — 29.18% — 150

Delete        Exit

Figure 2

Inventory Item Properties

Item Lookup Code 2002

Item Description Bike, Mongoose

Price $ 1,299.00

Cost $ 920.00

Profit Margin 29.18%

Delete    Exit

Figure 3

Set Access Control

Form Name  310   Form Class  330

Control Name  320   Column Name  340

| Access Level 350 | Disable Read 360 | Disable Change 370 |
|---|---|---|
| Level 0 | ☐ | ☐ |
| Level 1 | ☐ | ☐ |
| Level 2 | ☐ | ☐ |
| Level 3 | ☐ | ☐ |

OK 380   Cancel 390

Figure 4

| Form Name | Form Class | Control Name | Column Name | Access Level | Disable Read | Disable Change |
|---|---|---|---|---|---|---|
| 410 | 420 | 430 | 440 | 450 | 460 | 470 |
| frmDataItem Tax | | txtDescription | | Level0, Level2 | No | Yes |
| FrmDataItem | | txtItemLookupCode | | Level0, Level2 | No | Yes |
| frmDataItem | | txtPriceValue | | Level0, Level2 | No | Yes |
| frmDataItem | | textCostValue | | Level0 | Yes | Yes |
| frmDataItem | | txtProfitMargin | | Level0 | Yes | Yes |
| frmDataItem Tax | | txtDescription | | Level10 | No | No |
| FrmDataItem | | txtItemLookupCode | | Level10 | No | No |
| frmDataItem | | txtPriceValue | | Level10 | No | No |
| frmDataItem | | textCostValue | | Level10 | Yes | Yes |
| frmDataItem | | txtProfitMargin | | Level10 | Yes | Yes |
| ... | ... | ... | ... | ... | ... | ... |
| ... | ... | ... | ... | ... | ... | ... |
| ... | ... | ... | ... | ... | ... | ... |

Figure 5

Inventory Item Properties

Item Lookup Code: 2002

Item Description: Bike, Mongoose

Price: $ 1,299.00

Cost:

Profit Margin:

Delete

Exit

SYSTEM AND METHOD FOR CONTROLLING ACCESS TO USER INTERFACE ELEMENTS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates generally to techniques and methods for controlling access to data and commands in a graphical user interface system having a collection of different user interface elements. Each user interface element may contain sensitive data or functional characteristic that can only be accessed by authorized users.

A computer program communicates with the user by displaying commands and data on a display screen and accepts inputs from the user in the form of a mouse action, a keyboard press, or a touch screen action. The way each display screen is organized depends on the application. When a computer program contains sensitive data, or can access sensitive data, is used by more than one user, there is a need to limit access to the sensitive information. Information security has been addressed at the operating system, network, and protocol levels in the current art. Almost all computer operating systems provide means to control access to a file or a computer program for running the file; but it is up to the computer program to determine which commands or user interface elements on each display screen is accessible to which user. For example, a point of sale (POS) retail sales computer program is used by one or more cashiers and store managers to manage sales and inventory. The storeowner may allow cashiers to access only the sale prices and to hide all cost and profit information from cashiers; while store managers can have access to all information.

Most computer programs control access to information by limiting access to specific functional menus in the program. For example, Peachtree Office Accounting computer software restricts access, depending on user access level, to specific program areas (modules), which in turn restricts access to those display windows assigned to the restricted program areas. Instead of limiting access to specific user interface elements in each display window, this method disables access to the entire display window. This technique requires the non-restricted user interface elements contained in the restricted display window to be accessed by the user in a duplicate window that now only contains user interface elements that are accessible to the user based on the user's access level. Thus, the software programmer must create a duplicate window for each level of user access, gradually increasing the number of non-restricted user interface elements for every increased level of access. Therefore the current art requires additional programming and operation complexity that results in an increased cost to the user to achieve a secure user interface for multiple users of the same system or program.

Because of the duplicate window or different window method used by the current art, users of the system are required to learn new user interface displays, menus, and elements when they are granted a higher or different level of security access on the program or system. An example of this is when a cashier may be promoted to an assistant management position and subsequently has her security level increased to reflect her new responsibilities. Using the current art technique, the new assistant manager will have to learn a new set of program commands, menu items and window display layouts to perform her new duties. As a result, the new assistant manager has an increased learning curve for her new responsibilities and thus requires more time to become effective in her job and profitable for her employer.

An electronic cash register system has been developed which includes an administration system for enabling access on a clerk-by-clerk basis. In such a system, the clerk who handles the electronic cash register is first identified by the register before initiating the actual registration operation and totaling operation. Each clerk is assigned a unique identification number and inputs that number into the register, where the number has been previously stored, to access the cash register functions. The cash register may be programmed to allow different clerks access to different functions of the register. Such a system is disclosed in U.S. Pat. No. 4,570,223 "CASH REGISTER CONTROL SYSTEM FOR AUTHORIZATION OF SELECTED OPERATOR FUNCTIONS," issued on Feb. 11, 1986 to Yoshimoto (Osaka, JP). The invention requires a key switch to access the register and to program the register using keyboard combinations to manipulate hardwired circuits and switches contained in the register to control operator functions. It does not address access control of user interface elements in computer programs.

Notwithstanding the known information referred to above, a need still exists to provide an effective method for controlling access to individual user interface elements on each display screen in a computer program. This invention fulfills that need.

SUMMARY OF THE INVENTION

It is therefore one object of the present invention to provide an improved method and system of assigning and administering computer program security.

It is another object of the present invention to provide an improved method and system for controlling the behavior of each user interface element on the computer program display screen depending upon the user's access level.

It is yet another object of the present invention to provide an improved method and system of controlling access to each user interface element by changing the user interface element's properties using information stored in an access control table (profile).

It is yet another object of the present invention to provide an improved method and system for specifying access control for each user interface element interactively with unlimited access control combinations.

The foregoing objects are achieved as is now described. An access control profile is associated with each user interface element stored within a data processing system. Each access control profile preferably includes an explicit authorization parameter listing the identity of a particular user and the authorization level granted to that user. That authorization parameter is then associated with one or more user interface element's operations using an interactive means and the resulting association schema is placed within the access control profile of each user interface element. Thereafter, the access control profile of each user interface element is consulted to determine which access operations are allowed when the element is presented to the user. The determination of access operations at run time (when the element is displayed) enables the element's characteristics to be dynamically altered depending on the user's access level.

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF THE DRAWINGS

FIG. 1 is an example of a display window with all user interface elements enabled, FIG. 2 is an example of a display window in security set up mode with user interface elements highlighted, FIG. 3 is an example of a dialog box for setting access control, FIG. 4 shows an example of an access control table, FIG. 5 is an example of a display window in normal mode with some of the user interface elements disabled.

DETAILED DESCRIPTION OF THE PREFERRED EMBODIMENTS

Figure 6:
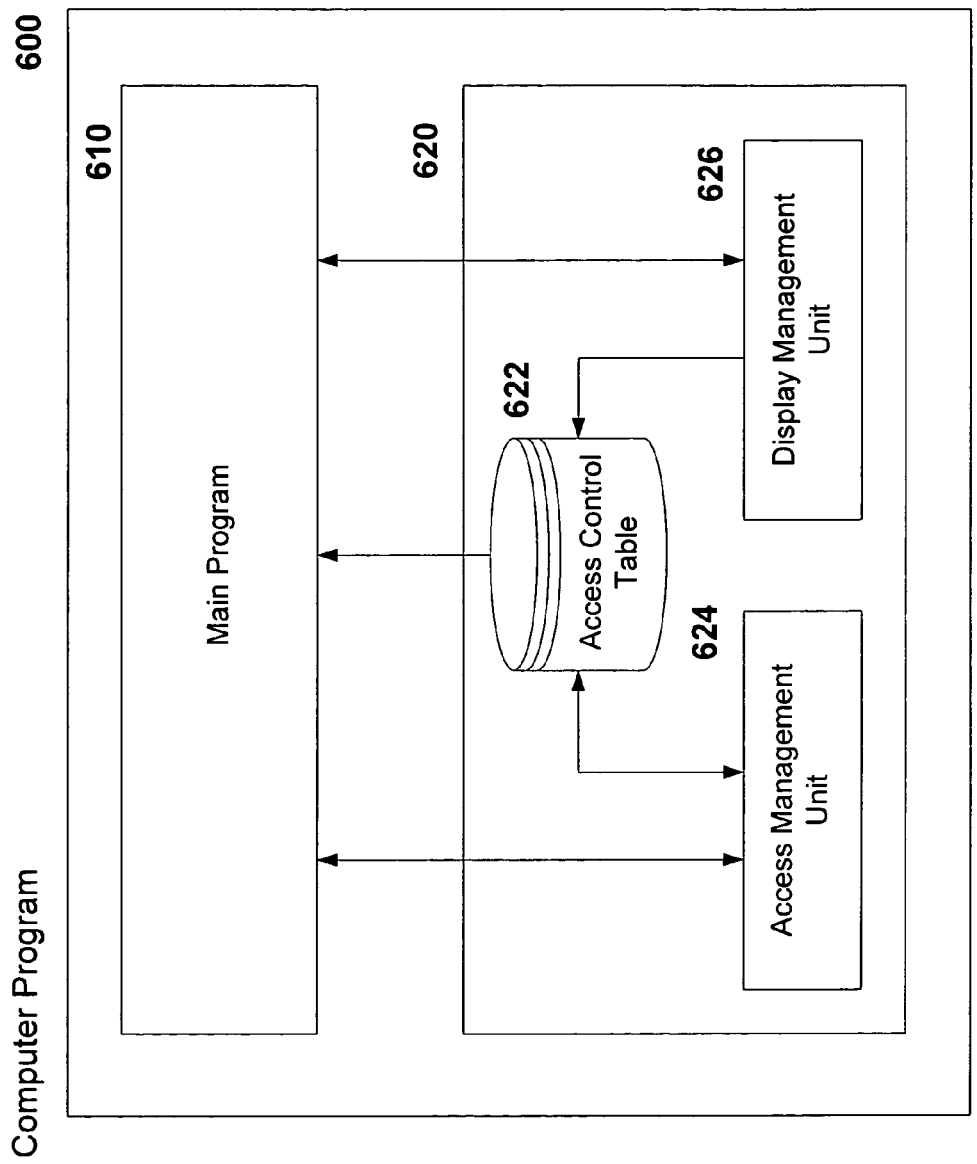
FIG. 6 shows a block diagram of a functional configuration of a computer program with access control implemented.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Most modern computer systems are designed to run under an operating system. For PC-based computers, the Microsoft Windows® operating system allows the user to control the computing environment. Likewise, the MAC OS® provides a graphical user interface to Apple computers. The mouse is the primary input device that users employ to interact with user interface elements in the graphical user interface. The term "mouse" also applies to other types of pointing devices that emulate a mouse, such as trackballs. The keyboard is used primarily for entering and editing textual information. It is also used to navigate, toggle modes, modify input, and, as a shortcut, invoke certain operations.

Display windows provide the fundamental way in which a user views data and interacts with the computer program. In many cases, the user interface of a computer program application can be established using a single display window. The display window provides a means of viewing and editing information. It is used to display to the user, user interface elements such as menus, controls, tool bars, and parameters and user input necessary to complete commands. By controlling how these user interface elements behave, one can control how the user sees and interacts with the computer program.

Almost all operating systems provide standardized methods for the user interface. In the Microsoft Windows® operating environment, menus are user interface elements that display a list of commands available to the user. There are several types of menus, including drop-down menus, shortcut menus, and cascading menus. Controls are graphical programming objects that represent the properties or operations of other user interface elements. Some controls display and allow editing of particular values. Other controls start associated commands or launch other user interface elements. Each control has a unique appearance and operation designed for a specific form of interaction. Buttons are controls that start actions or change properties. For example, pressing a Cancel button will abort the current command. An option button, also referred to as a radio button, represents a single choice within a limited set of mutually exclusive choices. A check box control represents an independent or non-exclusive choice. A list box is a control for displaying a list of choices for the user. The choices can be text, color, icons, or other graphics. The purpose of a list box is to display a collection of items and, in most cases, support selection of an item or items in the list. A text box (also referred to as an edit control) is a rectangular control where the user enters or edits text. The text box control provides basic text input and editing support. Editing includes inserting and deleting characters and the option of text wrapping. Toolbars and status bars are special interface constructs, like menu bars, for managing sets of controls.

Computer programs with a graphical user interface use common controls available in the operating system. For example, the Microsoft Word® program uses the control user interface elements defined in the Microsoft Windows® common control dynamic link library (DLL). The Microsoft Windows® user interface is the portion of the Win32® API that enables applications to interact with the user and to display windows, menus, and controls. More information on menus, controls, and toolbars for the Windows operating system and how to use them can be found in the Microsoft Windows User Experience, ISBN 0735605661. The window class and the corresponding window procedure define the properties, appearance, and behavior of the control. This invention exploits the capability of setting the appearance and behavior of the data control elements to implement a user programmable access control scheme in a useful and novel way.

FIG. 1 shows an example of a display window typically seen in a point of sale computer programs. In this example, attributes of an item in a retail store inventory are shown. The screen is used by cashiers, the store manager, and the storeowner to conduct daily operations. It is desirable that an access control mechanism is implemented in the computer program such that only certain users or groups of users can view or change certain values on the screen. In this particular example, the store owner would like to be able to view and change all fields on the screen while the store manager should be able to view and change the item lookup code 110, the item description 120, and the price 130. When a cashier views this screen, the cost 140 and the profit margin 150 should be hidden and the price 130 cannot be changed (view only) so the cashier cannot access sensitive cost and profit information.

The present invention eliminates the above mentioned problems with the current art and provides a user configurable access control mechanism by allowing an authorized user to interactively designate which fields or user interface elements on any given display screen can be accessed by a user or a group of users. The computer program can operate in the security setup mode or in normal mode. Only authorized users (the administrator) can enter the security setup mode. While in this mode, the computer program searches all user interface elements in each display window and highlights those whose access can be controlled. FIG. 2 shows an example of how a display window will look while in the security setup mode. In this particular implementation, a colored border is shown around the user interface elements whose access can be controlled. Other means of highlighting or selecting a particular user interface element can be used. The administrator locates which user interface element to set access control by using either a pointing device or a keyboard. Upon selection, the computer program reads the properties of the selected user interface elements and a dialog box is displayed, showing the access control options available to the administrator.

FIG. 3 shows an example of an implementation of a dialog box for a Microsoft Windows-based computer program. In FIG. 3, the form name 310 identifies the name of the display window where the user interface element is located. The control name 320 shows the name of the user interface element selected by the administrator to set access control. The form class 330 shows the type of form, if applicable. If the user interface element is a multi-column list, the name of the selected column is shown in the column name 340. The access level column 350 lists all access levels in the computer program. Each user of the computer program is granted an access level that is used as an index to find which user interface elements on which display windows the user is allowed to access. In this preferred embodiment, 32 levels are used to allow a 32-bit integer to represent access levels, one bit field for each level. More than 32 levels can be accommodated if so desired. The disable read 360 and disable change 370 fields define the access type, i.e. what a user at the specified access level can do to the user interface element. If the disable read 360 is selected, the user interface element will be hidden from the user and the user will not be able to change the user interface element's value. Otherwise, the user will be able to view the data in the user interface element. If the disable change 370 is selected, the user will be able to view but not modify the user interface element's value. The Cancel button 390 lets the administrator discard any changes. When the OK button 380 is activated, the information on this dialog box is saved to an access control table or database for use in the display mode. In this manner, access to any user interface element can be associated with any access levels while in security setup mode. Each user or group of users is then granted an access level for the selected user interface elements.

FIG. 4 shows an example of an access control table. In FIG. 4, numeral 410 denotes the name of the display form, numeral 420 denotes a type of form, numeral 430 denotes the name of the data control element, numeral 440 denotes the column name, numeral 450 denotes the access level, numeral 460 indicates if the user interface element should be displayed or hidden, and numeral 470 indicates if the user can view and modify the user interface element's contents. Additional information not related to the invention may be stored in this table as desired.

FIG. 5 is an example of a display window with the cost and profit margin user interface elements disabled. In normal mode, the user's access level is used in conjunction with the access control table to determine which user interface elements should be displayed to the user and how each user interface element should behave. For each user interface element on a display window, the form name and data control element name are used as an index into the access control table to look up the values of access level 450, disable read 460, and the disable change 470 parameters. If the access level 450 matches the user's access level and the disable read 460 is set to disable, viewing and changing of the user interface element's value are disabled. When disabled, the user interface element may appear as blank, grayed-out, or marked appropriately so that its value will not be shown. If the disable change 470 is set to disable, the user can view the user interface element value but will not be able to modify the value. Otherwise, the user interface element behaves normally.

FIG. 6 shows a functional configuration of a computer program with access control mechanism in accord with the present invention. In FIG. 6, numeral 600 denotes a computer program, which comprises a main program 610 and an access control and display capability means 620. The main program 610 performs all functions required to provide the computer program's capabilities and uses the access control and display capability means 620 to manage access control and display user interface elements. The access control and display capability 620 comprises an access control table 622, an access management unit 624, and a display management unit 626. The access control table 622 keeps track of access levels and associated access types; its data structure is shown in FIG. 4. The access management unit 624 allows an authorized user to enter security mode and setup access control on user interface elements. The display management unit 626 is used by the computer program to present information to the user.

Figure 7:
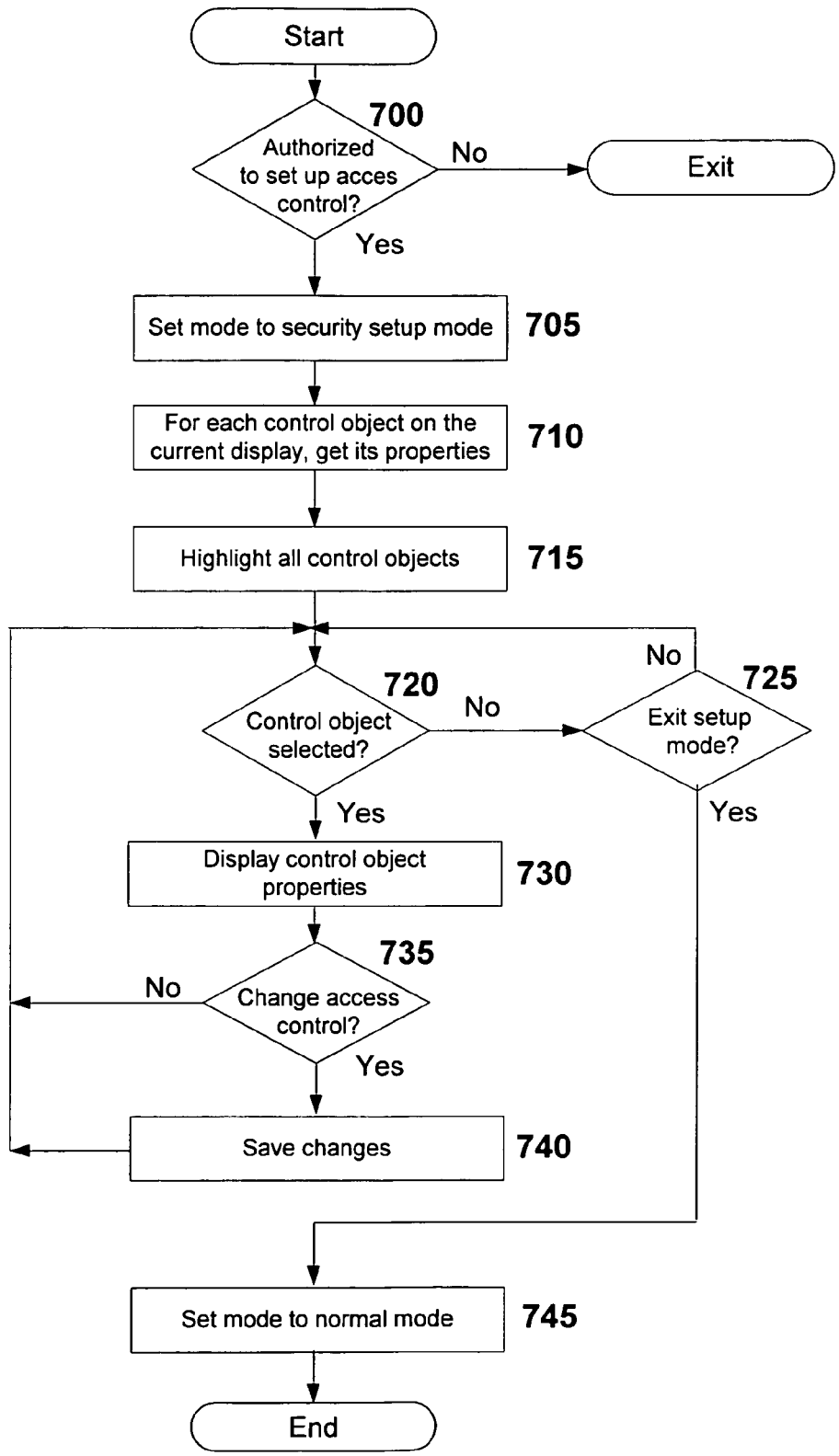
FIG. 7 shows a flow chart of a process for setting up access control.

FIG. 7 shows a simplified flow chart of the access management unit 624 in accordance with the present embodiment. This process is activated via a menu command, a keyboard input combination, or equivalent actions. Once activated, the user identification is verified (step 700) to ensure that the user has the required credential to enter the security setup mode. One skilled in the art may integrate this step with the user login procedure provided by the operating system to enable or disable the command to enter the security setup mode depending on the user credential. If the user has the required credential, the security setup mode is set (step 705) to indicate that security setup mode has been entered. The properties of each user interface element on the current display window are read (step 710) and the user interface elements are highlighted (step 715). Highlighting the user interface elements provides a visual cue for the user to know which user interface elements on the screen can have access control applied to them. When the user selects a highlighted user interface element, the access control table (see FIG. 4) is indexed by the display window form name 410, the form class 420, the control name 430, and the column name 440 to determine the access types associated with each access level 450. The control properties, access types, and access levels are displayed (step 730) using a dialog box like FIG. 3. If the user makes any change to the access level or access types (step 735), the changes will be saved in the access control table (step 740). Otherwise, the program remains in the security setup mode until exited (step 725). Upon exiting, the mode will be reverted to normal mode (step 745).

Figure 8:
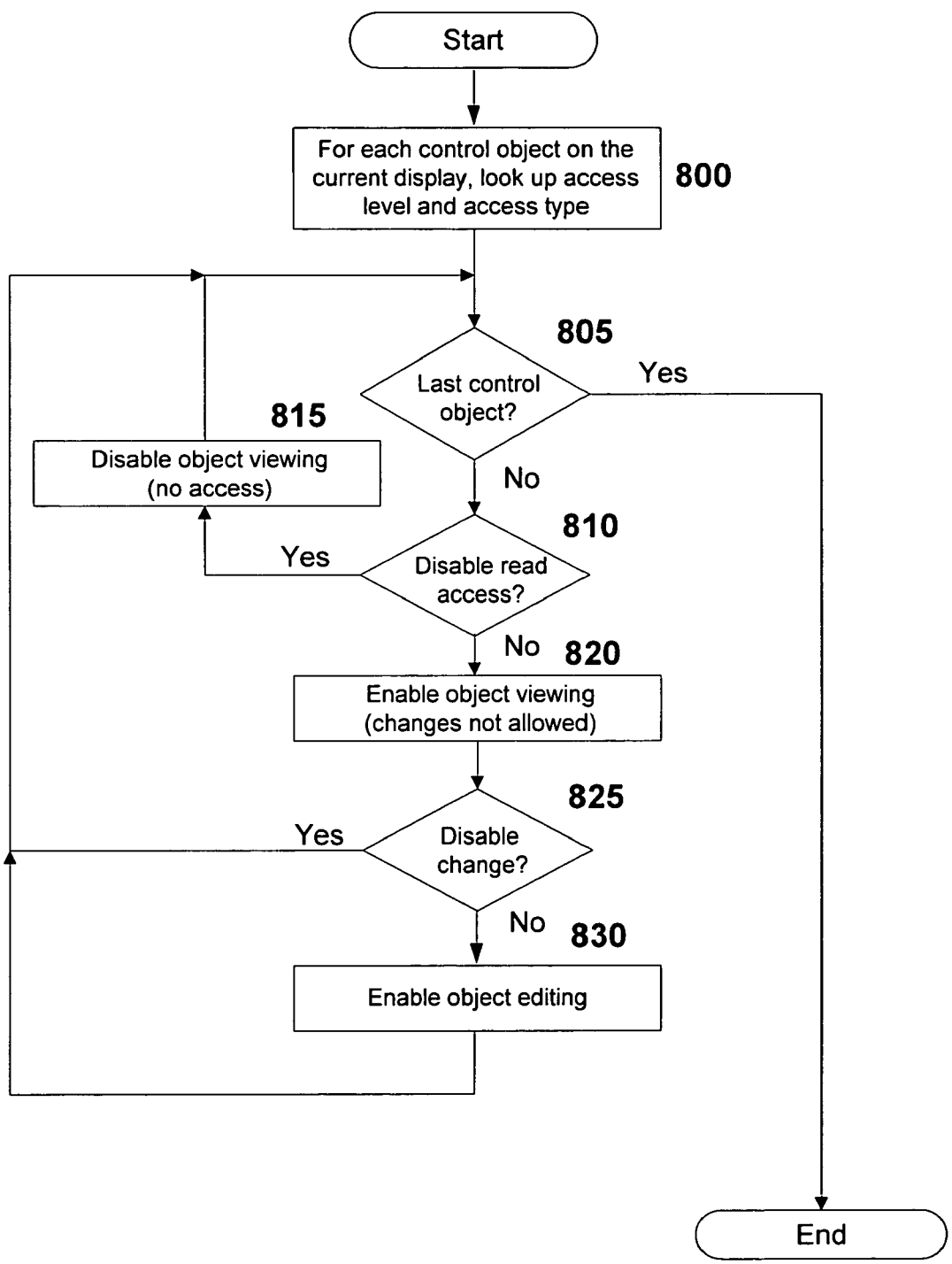
FIG. 8 shows a flow chart of a process for displaying user interface elements in accordance with the invention.

FIG. 8 shows a simplified flow chart of the display management unit 626 in accordance with the present embodiment. This process is activated every time the computer program needs to display data or present a dialog with the user. The display window handle is used to get the form name from the operating system. For each user interface element on the display window, the form name and user interface element name are used as an index into the access control table 622 to look up the values (step 800) of access level 450, disable read 460, and the disable change 470 parameters. Iteratively, through each user interface element (step 805), if the access level 450 matches the user's access level and the disable read 460 is set to disable, viewing and changing of the user interface element's value are disabled (step 815). Else, the user interface element is enabled for viewing (step 820). If the disable change 470 is not set to disable, the user interface element is enabled for editing (step 830). Else, the user interface element is enabled for viewing but not for changing (step 820).

What I claim as my invention is:

1. A computer-implemented method for controlling access to user interface fields in a point-of-sale system having a plurality of different user interface fields, the method comprising the steps of:
   operating the point-of-sale system in a security setup mode of operation by:
      accessing the plurality of user interface fields, wherein some of the user interface fields include a set of modifiable access properties that indicate a level of access needed to access that user interface field;
      establishing an access profile for each user of the point-of-sale system, the access profile indicates the level of access of user interface fields that each user is allowed to access; and
   controlling a value in each user interface field displayed on the point-of-sale system during a normal mode of operation by comparing the level of access indicated in the access profile of a user of the point-of-sale system with the level of access of each user interface field, wherein only those values in the user interface fields that have access property levels equal to or less than the level of access indicated in the access profile of the user are displayed.

2. The computer-implemented method of claim 1, wherein the access profile for each user of the point-of-sale system is indexed with the corresponding access properties for each said user interface field to be displayed on the point of sale system.

3. The computer implemented method of claim 1 further comprising hiding the value in each user interface field displayed on the point-of-sale system whose levels of access properties are greater than the levels of access indicated in the access profile of the user.

4. The computer-implemented method of claim 1, wherein accessing the plurality of user interface fields during operation of the point-of-sale system in a security setup mode comprises accessing user interface fields that are highlighted, wherein highlighted user interface fields are those user interface fields that include access properties that can be assigned a level of access.

5. The computer-implemented method of claim 1, wherein the access properties of a select user interface field comprise:
   a form name that identifies the name of the display window where the select user interface field is located;
   a control name that identifies the name of the select user interface field;
   a form class that identifies the type of form; and
   an access level that identifies the level of access of the select user interface field.

6. The computer-implemented method of claim 1, wherein the access properties that identify the level of access of the select user interface field further includes a disable read button and a disable change button, wherein if the disable read button is selected then a value in the select user interface field will be hidden from the user and if the disable change button is selected then a value in the select user interface field will be viewable to the user but can not be modified.

7. The computer-implemented method of claim 1, wherein controlling the value in each user interface field comprises preventing the rendering of a value in a select user interface field if the level of access in the access profile of the user indicates that the user is precluded from accessing the select user interface field.

8. The computer-implemented method of claim 1, wherein controlling the value in each user interface field comprises rendering a value in a select user interface field if the level of access in the access profile of the user indicates that the user has such privileges.

9. The computer-implemented method of claim 8, wherein controlling the value of each user interface field comprises allowing the user to modify a value in a select user interface field if the level of access in the access profile of the user indicate the user has such privileges.

10. A point-of-sale system that controls access to user interface fields, the point-of-sale system comprising:
   an access control module configured to manage access of a plurality of user interface fields for each user of the point of sale system, the access control module comprising:
      an access management module configured to allow an authorized administrator to set up access levels for user interface fields of the point-of-sale system;
      an access control table configured to store access profiles for each user of the point-of-sale system as set up by the authorized administrator, each access profile indicates the level of access of user interface fields that each user is allowed to access; and
      a display management module configured to instruct the point-of-sale system if values in user interface fields should be rendered by comparing the access levels of each user interface field to the access profile of a user, wherein the display management module displays values in user interface fields that have access levels equal to or less than the access levels of the access profile of the user.

11. The point-of-sale system of claim 10, further comprising a graphical user interface that contains one or more user interface fields.

12. The point-of-sale system of claim 10, wherein access levels of the user interface fields and the access profile of each user can be interactively changed by the authorized administrator.

13. The point-of-sale system of claim 10, wherein each access profile stored in the access control table is indexed according to access levels of the user interface fields.

14. The point-of-sale system of claim 10, wherein the display management module hides values in user interface fields in the point-of-sale system where access levels of user interface fields are greater than the access levels indicated in the access profile of the user.

15. The point-of-sale system of claim 10, wherein the display management module is configured prevent rendering a value in a select user interface field if the level of access in the access profile of the user indicates that the user is precluded from accessing the select user interface field.

16. The point-of-sale system of claim 10, wherein the display management module is configured to render a value in a select user interface field if the level of access in the access profile of the user indicates that the user has such privileges.

17. The point-of-sale system of claim 16, wherein the display management module is configured to allow the user to modify a value in a select user interface field if the level of access in the access profile of the user indicates the user has such privileges.

* * * * *